3,560,548
HALOGENATED BENZHYDRYL CARBONATES

Joseph W. Baker, Kirkwood, and Ignatius Schumacher, Webster Groves, Mo., assignors to Monsanto Company, St. Louis, Mo.
No Drawing. Filed Nov. 7, 1968, Ser. No. 774,170
Int. Cl. C07c *69/00;* A61k *27/00*
U.S. Cl. 260—463          9 Claims

ABSTRACT OF THE DISCLOSURE

This disclosure covers halogenated benzhydryl carbonates as new chemical compounds. These compounds have been found to be useful in the control of bacteria.

---

This invention relates to a novel class of organic chemical compounds. More particularly, this invention is concerned with novel alkyl and haloalkyl-carbonates of halogenated benzhydryls. Such materials have been found to possess useful and unexpected biological activity.

The novel compounds of this invention have the formula

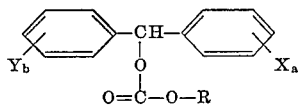

wherein X and Y are each selected from chlorine and bromine, $a$ is an integer from zero to three, $b$ is an integer from one to three, and R is selected from lower alkyl, and mono and dihalogenated lower alkyl, the halogen being selected from chlorine and bromine. As employed herein, the term "lower alkyl" designates both the straight and branched chain alkyl radicals of up to 4 carbon atoms.

The novel carbonates of this invention can be readily prepared by reacting a halogenated benzhydrol with an alkyl or haloalkyl chloroformate. In carrying out such a reaction, it is preferred to add a tertiary amine to the reaction mixture to serve as an acceptor for the hydrogen chloride formed during the course of the reaction. Examples of tertiary amines which can be used for this purpose include triethylamine, isoquinoline, 4-picoline, quinaldine, pyridine, and the like. A typical reaction utilizing an amine acceptor is illustrated by the following equation:

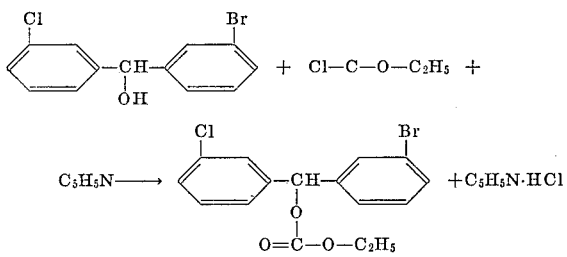

It is preferred to carry out the reaction in the presence of an inert organic solvent. Suitable solvents include benzene, toluene, xylene, the chlorinated benzenes, ethyl ether, propyl ether, tetrahydrofuran, and the like. The reaction temperatures employed in the preparation of the compounds of this invention will vary from room temperature to the reflux temperature of the reaction mixture. The specific temperature employed in any given preparation will be primarily dependent upon the particular reactants used therein. It should be noted that although the presence of both a tertiary amine and an inert organic solvent is preferred, neither of these materials is essential to the preparation of the compounds described herein.

The invention will be more fully understood by reference to the following examples which are set forth herein for the purpose of illustration only and which are not to be construed as limiting the scope of this invention in any manner.

EXAMPLE 1

A suitable reaction vessel is charged with a solution of 6.4 grams (0.02 mole) of 3,3',4,4'-tetrachlorobenzhydrol in 100 ml. of ether. There is added 3.1 grams (0.022 mole) of 2-chloroethyl chloroformate. These starting materials are permitted to react for about 2 hours, 2.0 grams (0.02 mole) of triethylamine being added during the first 5 minutes of the reaction period. A heavy, white precipitate forms and is removed by filtration. The filtrate is washed with water, cooled to induce unreacted benzhydrol to crystallize, and filtered again. The filtrate is then evaporated, and the residue is dried under vacuum. The product collected is 6.5 grams of 2-chloroethyl 3,3',4,4'-tetrachlorobenzhydryl carbonate, a colorless oil, $n_D^{25}$ 1.5825. Analysis shows 42.6% of chlorine as against a calculated value of 42.99% for $C_{16}H_{11}Cl_5O_3$.

EXAMPLE 2

Following the detailed procedure set forth in Example 1, the reactants employed are 5.8 grams of 2,3',4-trichlorobenzhydrol and 2.7 grams of isopropyl chloroformate. The product obtained is isopropyl 3,4'-dichlorobenzhydryl carbonate.

EXAMPLE 3

Following the detailed procedure set forth in Example 1, the reactants employed are 5.8 grams of 2,3',4-trichloro' benzhydrol and 3.8 grams of 4-chlorobutyl chloroformate. The product obtained is 4-chlorobutyl 2,3',4-trichlorobenzhydryl carbonate.

EXAMPLE 4

Following the detailed procedure set for the Example 1, the reactants employed are 5.8 grams of 3,4,5-trichlorobenzhydrol and 4.4 grams of 3-bromopropyl chloroformate. The product obtained is 3-bromopropyl 3,4,5-trichlorobenzhydryl carbonate.

EXAMPLE 5

Following the detailed procedure set forth in Example 1, the reactants employed are 4.4 grams of 4-chlorobenzhydrol and 3.0 grams of t-butyl chloroformate. The product obtained is t-butyl 4-chlorobenzhydryl carbonate.

EXAMPLE 6

Following the detailed procedure set forth in Example 1, the reactants employed are 6.8 grams of 4,4'-dibromobenzhydrol and 4.2 grams of 2.3-dichloropropyl chloroformate. The product obtained is 2,3-dichloropropyl 4,4'-dibromobenzhydryl carbonate.

EXAMPLE 7

Following the detailed procedure set forth in Example 1, the reactants employed are 7.6 grams of 3,4-dibromo-3'-chlorobenzhydrol and 4.1 grams of 2-bromoethyl chloroformate. The produce obtained is 2-bromoethyl 3,4-dibromo-3'-chlorobenzhydryl carbonate.

EXAMPLE 8

Following the detailed procedure set forth in Example 1, the reactants employed are 6.4 grams of 2,2',4,4'-tetrachlorobenzhydrol and 3.1 grams of 2-chloroethyl chloroformate. The product obtained is 2-chloroethyl 2,2',4,4'-tetrachlorobenzhydryl carbonate.

As stated above, the products of the present invention are useful as microbiocides adapted to be employed for the control of gram positive bacterial organisms. In a representative test, 2-chloroethyl 3,3',4,4'-tetrachlorobenzhydryl carbonate is found to be effective against *Staphylococcus aureus* at a dilution in excess of 1 part per million. Similar activity is displayed by other and different halogenated benzhydryl carbonates of this invention.

While the invention has been described herein with regard to certain specific embodiments, it is not so limited. It is to be understood that variations and modifications thereof may be made by those skilled in the art without departing from the spirit and scope of the invention.

The embodiments of the invention in which an exclusive property or privilage is claimed are defined as follows:

1. A compound of the formula

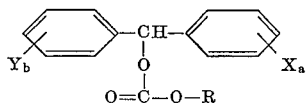

wherein X and Y are each selected from chlorine and bromine, $a$ is an integer from zero to three, $b$ is an integor from one to three, and R is selected from lower alkyl, and mono and dihalogenated lower alkyl, the halogen being selected from chlorine and bromine.

2. A compound as defined in claim 1 wherein X and Y are chlorine and R is lower alkyl.

3. A compound as defined in claim 1 wherein X and Y are chlorine and R is selected from mono and dihalogenated lower alkyl, the halogen being selected from chlorine and bromine.

4. A compound as defined in claim 1 wherein X and Y are bromine and R is lower alkyl.

5. A compound as defined in claim 1 wherein X and Y are bromine and R is selected from mono and dihalogenated lower alkyl, the halogen being selected from chlorine and bromine.

6. A compound as defined in claim 2 wherein $a$ and $b$ are each two.

7. A compound as defined in claim 3 wherein $a$ and $b$ are each two.

8. A compound as defined in claim 1 which is 2-chloroethyl 3,3',4,4'-tetrachlorobenzhydryl carbonate.

9. A compound as defined in claim 1 which is 2-chloroethyl 2,2',4,4'-tetrachlorobenzhydryl carbonate.

References Cited

UNITED STATES PATENTS

| | | | |
|---|---|---|---|
| 2,895,871 | 7/1959 | Entemann | 260—618X |
| 3,365,484 | 1/1968 | Mayer et al. | 260—482 |

LEWIS GOTTS, Primary Examiner

D.G. RIVERS, Assistant Examiner

U.S. Cl. X.R.

424—301

PO-1050
(5/69)

UNITED STATES PATENT OFFICE
CERTIFICATE OF CORRECTION

Patent No. 3,560,548      Dated February 2, 1971

Inventor(s) Joseph W. Baker and Ignatius Schumacher

It is certified that error appears in the above-identified patent and that said Letters Patent are hereby corrected as shown below:

Column 2, line 27, " 5.8 " should read -- 5.1 --;
line 27, " 2,3',4-trichloro- " should read -- 3,4'-dichloro- --. Column 3, line 4, " 2-chloroethyl 3,3',4',4' " should read -- 2-chloroethyl 3,3',4,4' --. Column 3, line 24, " integor " should read -- integer --.

Signed and sealed this 29th day of June 1971.

(SEAL)
Attest:

EDWARD M. FLETCHER, JR.
Attesting Officer

WILLIAM E. SCHUYLER
Commissioner of Pat